O. C. F. WILCKE.
AUTOMOBILE LIGHTING APPARATUS.
APPLICATION FILED JAN. 24, 1912.
1,169,216.
Patented Jan. 25, 1916.
3 SHEETS—SHEET 1.
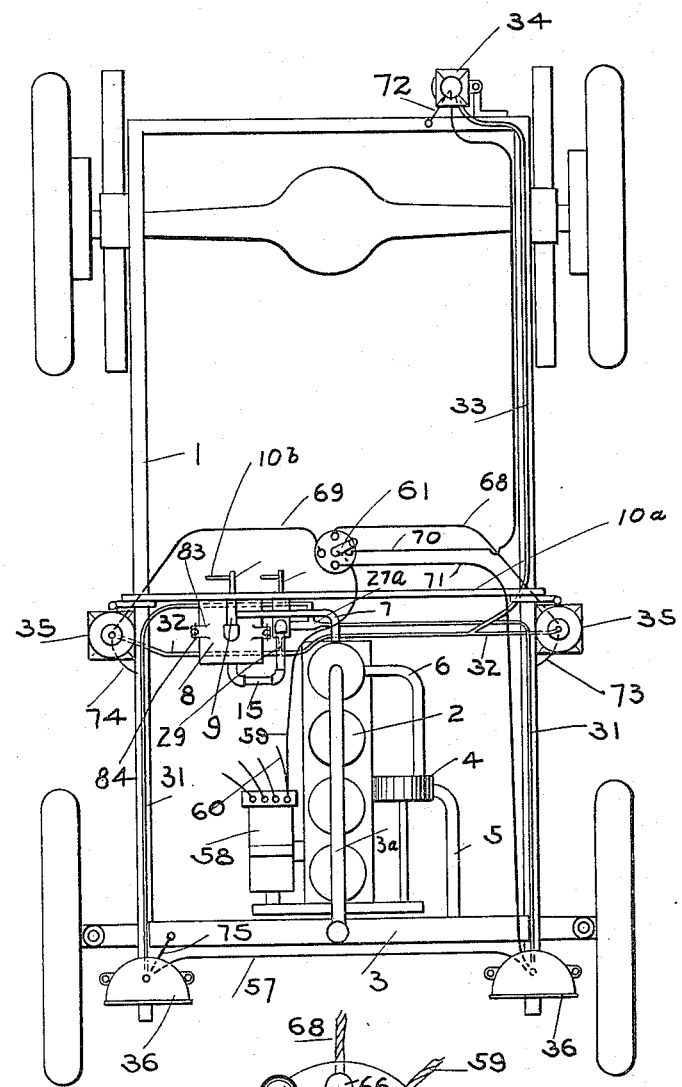
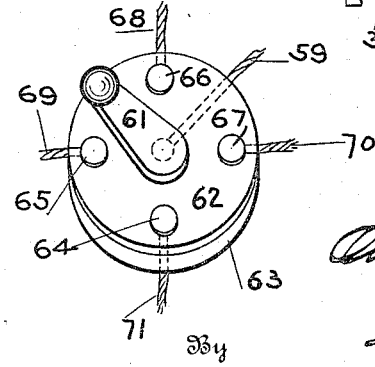

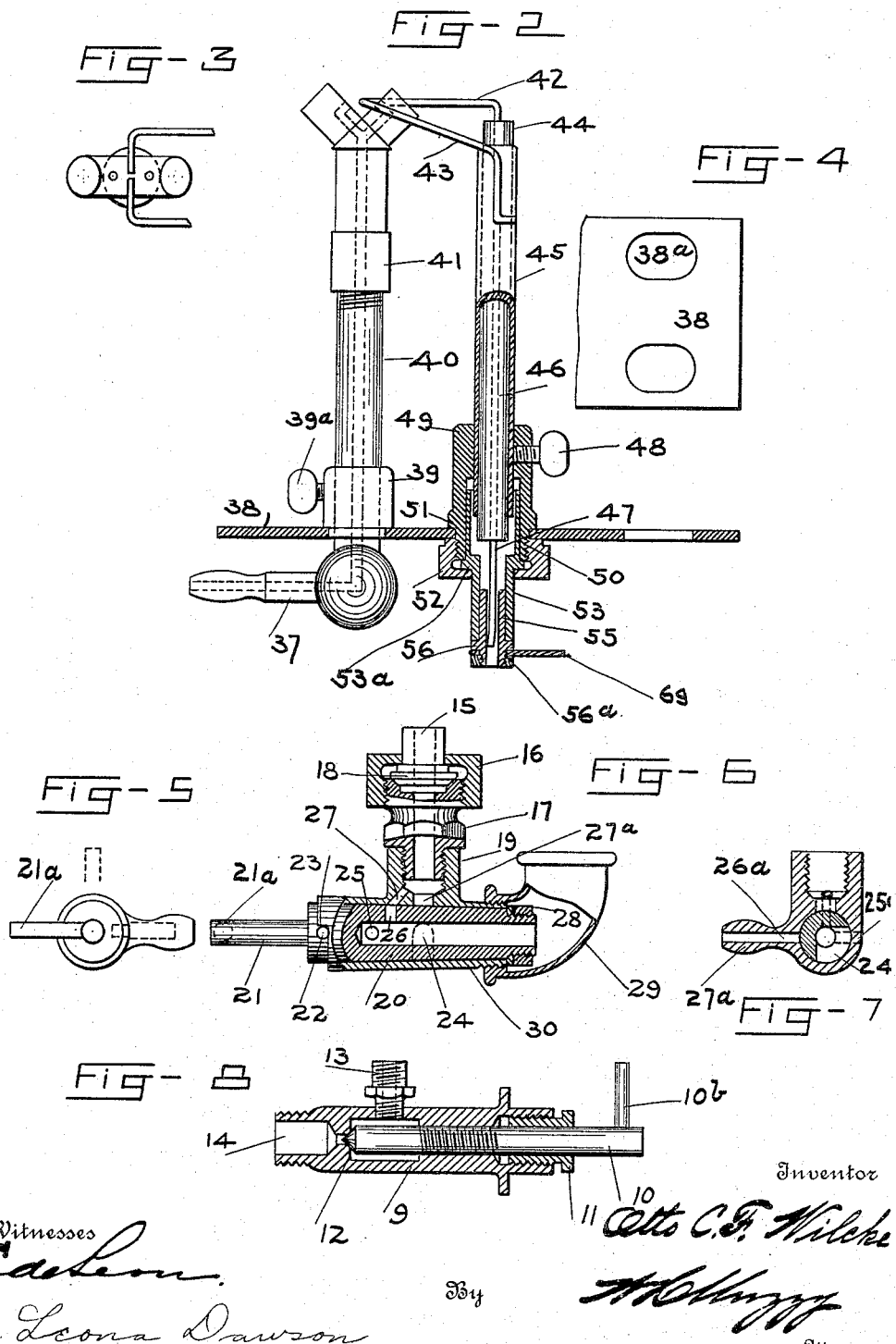

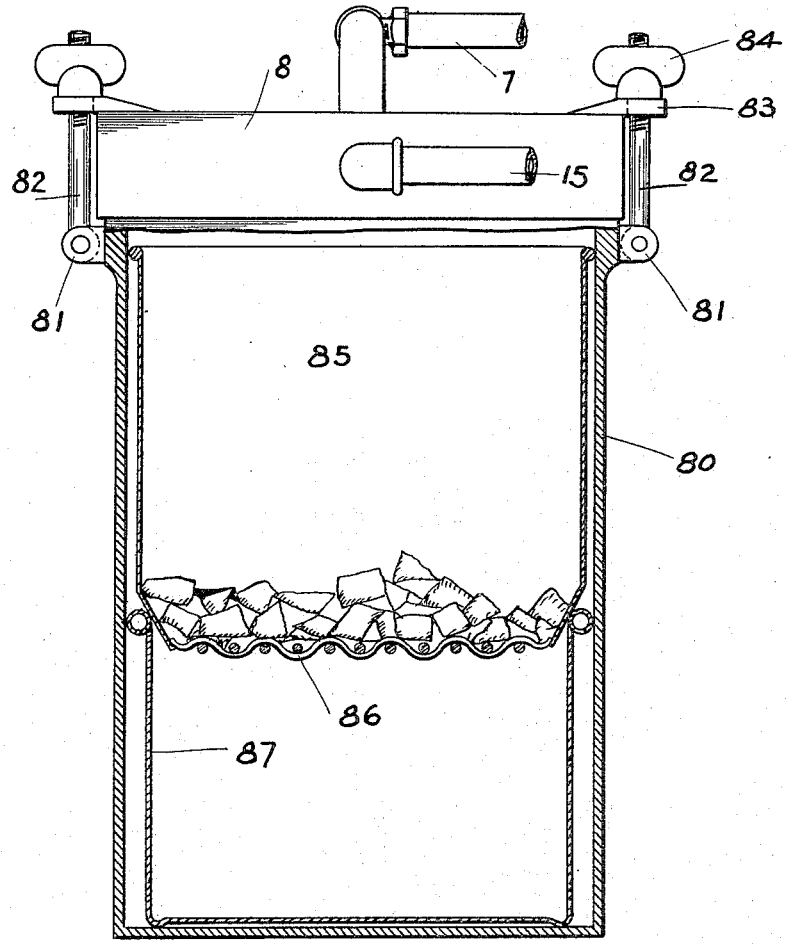

UNITED STATES PATENT OFFICE.

OTTO C. F. WILCKE, OF DAYTON, OHIO.

AUTOMOBILE-LIGHTING APPARATUS.

1,169,216.  Specification of Letters Patent.  Patented Jan. 25, 1916.

Application filed January 24, 1912. Serial No. 673,203.

*To all whom it may concern:*

Be it known that I, OTTO C. F. WILCKE, a citizen of the United States, residing at Dayton, in the county of Montgomery and State of Ohio, have invented certain new and useful Improvements in Automobile-Lighting Apparatus, of which I declare the following to be a full, clear, and exact description.
This invention relates to improvements in lighting apparatus and has more particular relation to improvements in carbid lighting systems for automobiles or the like.

One of the principal objects of the invention is to provide an apparatus for the generation of gas from carbid crystals and which can be used in extremely low temperatures.

A further object is to provide a gas generating apparatus which will be supplied with water under pressure.

Another object is to provide a gas generating apparatus in which the water will be supplied to the generating tank from the regular water system of a gas engine.

Another object is to provide improved apparatus for lighting the different gas lamps of an automobile from the driver's seat.
The invention also has further objects all of which will be hereinafter more fully described and claimed and which will become clear by inspection of the accompanying drawings, in which:
Figure 1, represents a top plan view of an automobile chassis with my improvements applied thereto; some of the parts being omitted for clearness; Fig. 2, represents a detail side elevation partly in section of the burner, and the electric lighting apparatus; Fig. 3, represents a detail top plan view of the gas burner; Fig. 4, represents a detail top plan view of the adjustable burner plate; Fig. 5, represents a detail front elevation of the gas distributer; Fig. 6 represents a detail side elevation, partly in section, of the same; Fig. 7, represents a detail vertical section through the gas distributer on the line of the supply pipe; Fig. 8, represents a detail vertical section through the needle valve of the water supply pipe; Fig. 9, represents a detail perspective view of the distributer switch and, Fig. 10, represents a detail vertical section partly broken away of the carbid tank and cover.

For the sake of illustration I have shown my invention applied to an automobile having a magneto ignition system but it will be readily understood that the invention can with equal facility be applied to systems including the ordinary vibrator coil ignition system.

In the aforesaid drawings, 1 represents the frame of the machine, 2 the ordinary water cooled gas engine, 3 the radiator of the machine connected by pipe $3^a$ with the water jackets of the cylinders. Pipe 5 connects the lower part of the radiator to any suitable form of pump 4, which forces the water through the pipe 6 into the cylinder jacket in a manner well known in the art and forming no part of this invention.

A pipe 7 is tapped into the water jacket of any one of the cylinders. This pipe 7 as best shown in Figs. 1 and 8 is connected to the casing 9 of the valve 10 by attaching nipple 13. This valve 10 may be of any desired form with a taper point 12 which screws down upon a suitable seat, when the valve is closed. Any suitable form of packing sleeve 11 may be provided. The stem of the valve 10 projects through the dash board $10^a$ of the machine and is provided with an operating handle $10^c$ by which it is operated at will by the driver. The needle valve casing is provided with a screw end 14, by means of which it is connected to the carbid tank 8. This tank is of any suitable construction but is formed with a solid top secured to the dash. The lower removable cylinder 80 of the tank abuts against a suitable packing ring in the top, and is held against it by screw threaded rods 82 hinged to lugs 81 on the tank and passing between the arms of slotted lugs 83 on the top of the tank; thumb screws 84 being mounted on the upper ends of rods 82 to hold the tank in position. An ash pan 87 and carbid basket 85 having an ash guiding flange 86 is mounted in the tank. The gas formed in the tank 8 passes out through a pipe 15 (see Figs. 1 and 6) into a distributing valve 20. The pipe 15 is provided with a head 18 which is held by a hollow nut 16, upon a seat in an attaching nipple 17. This nipple is in turn screwed into a sleeve 19 forming part of the casing 30 of the distributing valve 20. The part 17 forms a continuation of pipe 15 and discharges into the sleeve 19. The valve 20 is conical and is mounted in casing 30, being held in position by nut 28. The distributing valve is limited in its motion by pin 22 abutting shoulders 23 formed on the casing 30.

A stem 21 of the distributing valve projects through the dash 10$^a$ and is provided with a handle 21$^a$, by which it may be adjusted to its different positions.

The valve 20 as best shown in Figs. 6 and 7 is hollow and is provided with ports 23, 25, and 26. When it is in the position shown in Fig. 6 the gas passes from the pipe 15 through a channel 27 formed in the casing 30 and through the port 26 into the interior of the distributing valve, whence it passes through port 25 and port 25$^a$ formed in the casing 30 and escapes.

When the distributer is turned to an intermediate position the port 26 will pass out of alinement with the port 27, and the ports 25 and 25$^a$ will also pass out of alinement but the port 24, in the shape of a quadrant, will be brought into connection with a port 27$^a$ in casing 30 which will permit the gas to enter the valve 20 and pass out through its open end into pipe 29 from whence it is distributed by branch pipes 32 to side lamp 35 and by pipe 33 to a tail-light 34.

When the valve 20 is adjusted to its third position the ports 24 and 27$^a$ still remain open to each other but in addition the port 26 is brought into alinement with a port 26$^a$ of a pipe nipple 27$^a$ which connects by pipes 31 with the head lights 36.

In Fig. 2 I have shown my preferred form of burner which is mounted on a slotted adjustable plate 38 which in turn is mounted in the lamp by suitable screws so that it may be moved backward and forward to secure the proper focus with the lamp reflector. This burner comprises the usual tip 41 mounted on a pipe 40 which passes through the plate 38 and is held in position by a sleeve 39 clamped thereto by a thumb nut 39$^a$.

The sleeve 39 rests upon the plate 38. A pipe nipple 37 is formed on the lower end of the pipe 40 to connect with the gas pipe system.

The gas is ignited at the burner 41 by a high tension spark jumping between the sparking points of wires 42 and 43. The wire 42 passes down through an insulating sleeve 46 which is mounted in a sleeve 45. This latter sleeve supports the companion wire 43. The sleeve 45 is adjustably supported in a collar 49 by a thumb-screw 48. This collar is formed with a shoulder 51 which rests on plate 38; the lower part of the collar being screw-threaded as at 50 to receive a clamping nut 52. An insulating sleeve 53 is supported on a flange 53$^a$ of the nut 52, and projecting up into the sleeve 51 as shown. The lower end, 47 of the wire 42, is sprung to one side to contact with a metal sleeve 55, rigidly mounted in the sleeve 53 and provided with a locking nut 56$^a$ by means of which one of the high tension wires is secured thereto.

It will be seen from the above that the wires 42 and 43 may be adjusted vertically, by loosening the thumb nut 48 and moving sleeve 45 up or down and turning it from side to side. By this means the spark gap may be brought to the desired position.

A distributer switch 62 is mounted on an insulating plate 63 which in turn is mounted on the dash board of the machine. A wire 59 leads from one of the high tension wires 60 of the magneto to the switch lever 61. As best shown in Fig. 9 the switch lever when moved in a circle comes in contact with contact buttons 64, 65 66 and 67. Wires 68, 69, 70 and 71 lead from the contact to the different head lights, side lights, and tail lights.

The use of carbid generators at present on the market is not practical in cold weather as the water supply freezes having nothing to keep it warm. Further the needle valve for controlling the water supply is subjected to the corrosive action of the gas and soon becomes clogged so that the water will not feed. With my improved devices the water is always kept hot by the engine and in addition is under pressure so that it will force past the needle valve and will wash away all corrosion or crystals forming at this point. Further no independent source of water supply is necessary and the operator cannot forget to supply his generator with water.

The generator may be connected, if desired to pipes for supplying gas to the cylinders for starting purposes in which case a vibrator coil would be employed for causing a spark at the plugs in a well known manner. In such case one of the positions of the distributing valve would supply a pipe that would lead to all of the cylinders to supply them with a charge of gas for starting the motor. Any suitable check valve would be mounted in each supply pipe near the cylinder to prevent any back pressure in the cylinder.

It will further be seen that the location of the generator tank is such that the water from the cylinder jackets will feed to the generator tank by gravity when the engine is not running. By this construction the generator will automatically be supplied with more water when the engine is started and this supply will automatically be cut down when the engine is stopped as when the machine is waiting at the curb. The lights will thus automatically be turned up and down; more light being desired when running than when standing still.

Having thus described my invention what I claim as new and desire to secure by Letters Patent is:

1. In an automobile, the combination with a heat engine including a water circulating cooling system, of a carbid gas generator, a water pump driven by the engine for putting the water under pressure, and means connecting the water system to the generator and devices for utilizing the gas from the generator.

2. In an automobile, the combination with a carbid gas generator, of a heat engine having a water cooling system, and means connecting the water cooling system and generator and devices for utilizing the gas from the generator.

3. In an automobile the combination with a carbid gas generator, of a heat engine having a water cooling system, lamps for the machine, means connecting the water system and generator and means connecting the lamps and generator.

4. In an automobile the combination with a carbid gas generator, of a heat engine having a water cooling system, means for utilizing the gas of the generator pipes connecting the water system and generator, and means controlled by the engine for igniting the carbid gas.

5. In an automobile the combination with a gas engine having a forced water cooling system, a gas generator connected to the water system, and automatically controlled thereby and devices for utilizing the gas from the generator.

In testimony whereof I affix my signature in the presence of two witnesses.

OTTO C. F. WILCKE.

Witnesses:
 LEONA DAWSON,
 EVELYN KEYES.

Copies of this patent may be obtained for five cents each, by addressing the "Commissioner of Patents, Washington, D. C."